United States Patent

[11] 3,616,934

[72] Inventor  Joseph C. Ehrlich
               2440 Sedgewick Ave, Bronx, N.Y. 10468
[21] Appl. No. 836,813
[22] Filed     June 26, 1969
[45] Patented  Nov. 2, 1971

[54] FILTER DEVICE WITH DISPOSABLE FILTER FOR MAKING COFFEE, TEA AND THE LIKE
     16 Claims, 10 Drawing Figs.
[52] U.S. Cl. .................................................. 210/471,
                                          210/474, 99/77.1
[51] Int. Cl. .............................................. B01d 23/04
[50] Field of Search ........................................... 99/77.1;
                                       210/481, 480, 474, 471

[56]              References Cited
              UNITED STATES PATENTS
2,749,835   6/1956   Hiscock ....................... 210/481 X
3,370,524   2/1968   Kasakoff ...................... 99/77.1 X
              FOREIGN PATENTS
93,786      0/1921   Switzerland .................. 210/471

Primary Examiner—Samih N. Zaharna
Assistant Examiner—Frederick F. Calvetti
Attorney—Emanuel R. Posnack ABSTRACT: The combination of a disposable open-top filter bag and a holder member therefor for use with a coffee pot or the like. The filter bag has at the laterally opposite sides of the upper mouth portion thereof two transversely extending open-ended channels, the holder member having two arms extending through and slidably engageable with the respective channels, the arms having intermediate portions thereof bent laterally in opposite directions and adapted to spread open the mouth portion of the filter bag when the arms are inserted and slidably moved through the channels. The holder member is formed of a single smooth wire, and has forward and rear portions protruding from the front and rear portions of the bag, the protruding portions being adapted to rest upon the rim (in one embodiment of this invention) of the container with the filter bag freely suspended from the holder member and disposed within the container out of engagement with the walls thereof.

PATENTED NOV 2 1971 3,616,934

INVENTOR.
JOSEPH C. EHRLICH
BY Emanuel R. Posnack
ATTORNEY

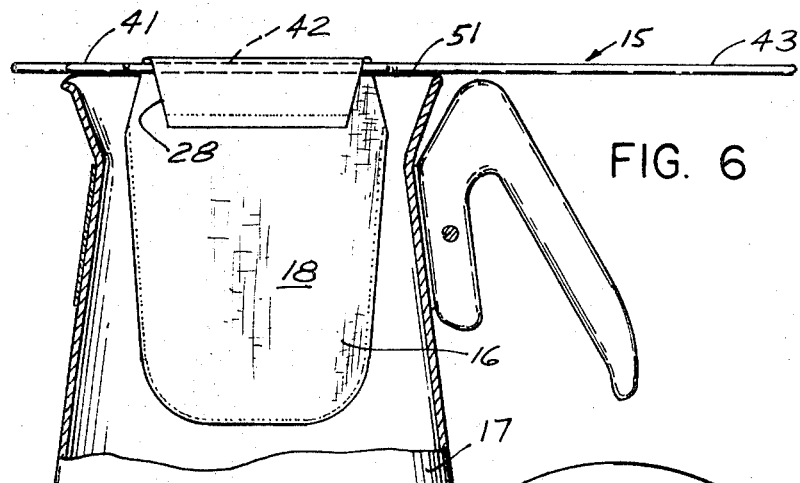
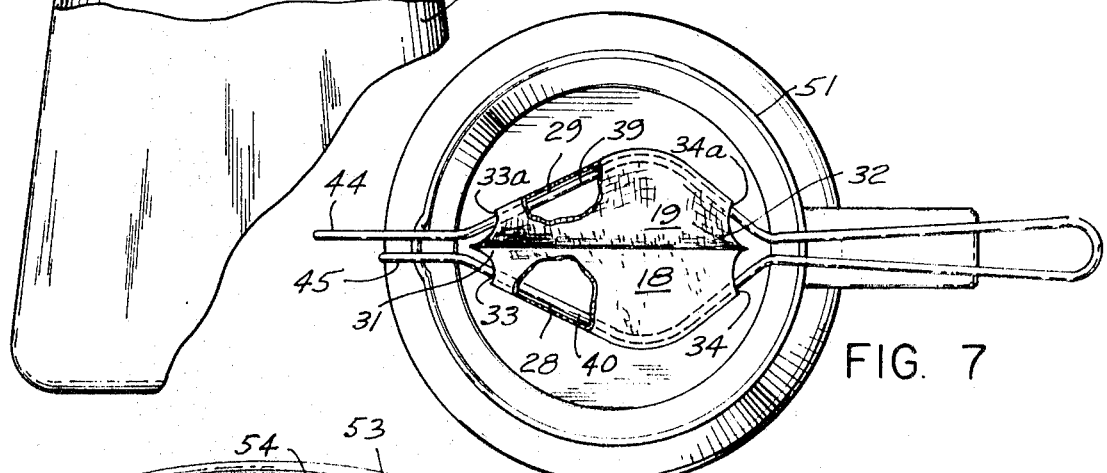
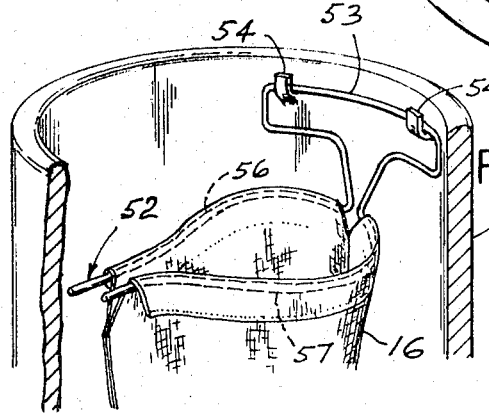
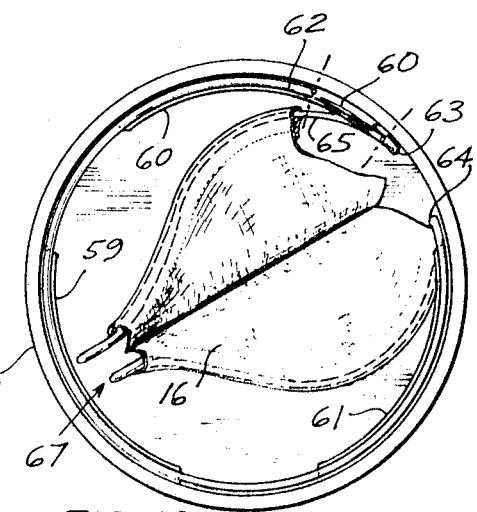
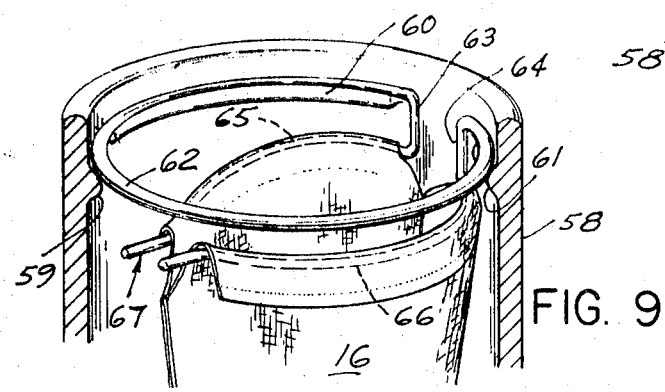

FILTER DEVICE WITH DISPOSABLE FILTER FOR MAKING COFFEE, TEA AND THE LIKE

BACKGROUND OF THE INVENTION

1. The Field of the Invention

This invention relates to filter devices for coffee and tea, and is particularly directed to means for operatively and removably supporting disposable paper filters on suitable containers, such as coffee pots or cups.

2. The Known Art

The use of filters in coffee making is a common expedient, many of such devices having perforated filter baskets or water-permeable cloth bags which, upon repeated use, become clogged with used coffee grains. Such clogged filters adversely affect the quality and taste of subsequently filtered coffee, thus requiring repeated cleaning operations. To overcome this shortcoming, attempts have been made to employ disposable filters made of relatively inexpensive filter paper, but the results have not been satisfactory in a number of respects, such as the following: difficulties in properly positioning the filters in optimum relation to the container; difficulties in attaching the filter to a suitable holder and in removing it from the holder; mutilation of the paper filter during such attachment and removal operations; difficulties in applying the filter holder to the coffee pot or other container; insufficient filtration area because of design limitations of the filter or because of the reduction of filtration area by contact with the inner wall of the container, thereby resulting in slow permeation of the water through the limited filtration area with consequently poor tasting coffee; contacting of the filtering area with metallic portions of the coffee pot, thereby adversely affecting the coffee taste; restricted use of the filter to a particular system of coffee making, such use being generally limited to the making of drip coffee; high cost and lack of compactness of filter units.

OBJECTIVES OF THE INVENTION

The present invention has for its main objective the provision of filter devices with disposable filters having none of the shortcomings above mentioned, and which are adapted to ready application to various types of containers for effectively and efficiently making coffee comprising a pure, clear filtrate, meeting the highest standards of taste. More specifically, the objects of this invention include the provision of the following; novel holder means adapted readily to receive thereon a paper filter bag and to reform said bag from its original flat condition to one in which the mouth of the bag is open for receiving therethrough suitably ground coffee particles and water; means to support the filter bag in substantially free suspension within a coffee pot or other container, whereby the sides of the filter bag are spaced from the wall of the container, thereby to expose the maximum filtration area to effect a minimum of filtration time and to minimize the danger of coffee particles and the filtrate contacting metal container walls; means for readily applying the filter holder device manually to containers of various types without the use of special fasteners or the need for special mechanical skills; means on the holder and filter bag for enabling the bag to be slid on and off the said holder; and means on the holder and paper filter bag for permitting the mouth mouth of the bag to be operatively spread without the danger of tearing of bag material.

Other objects, features and advantages will appear from the drawings and the description hereinafter given.

SUMMARY OF THE INVENTION

The preferred embodiment of this invention comprises a holder member and a filter bag, the holder member slidably supporting the bag and being itself adapted to be supported by the upper portion of a coffee pot, an individual coffee cup or other suitable container.

The filter bag, preferably made of suitable filter paper, is formed from two flat sheets secured together by stitching or other means along the opposite side and bottom peripheries, leaving the upper portions unattached and defining the bag's mouth. The laterally opposite upper wall portions of the bag have two transverse channels in flanking relation to the mouth, there being two slit portions extending a distance downwardly from the mouth of the bag along the lines of the respective peripheral seams thereof, the respective slits being disposed between the adjacent terminals of the two said channels, thereby to permit the operative spreading of the laterally opposite mouth portions without tearing or mutilating the bag. In the preferred form the said two opposite secured-together peripheries are tapered inwardly and downwardly, whereby the widest portion of the bag is at the region of the bottom terminals of said slit portions.

The said holder member is preferably made of wire and has two arms in adjacent spaced relation, laterally opposite intermediate portions of said arms being bent outwardly in opposite directions, and being preferably of substantially curved or arcuate configuration. The forward portion of the holder comprises two separated substantially parallel terminal fingers, one being preferably longer than the other, whereby said fingers can be operatively inserted through the said two channels of the filter bag and moved forwardly therethrough until said fingers protrude from the front of the bag, the two said outwardly bent intermediate portions spreading the mouth of the bag apart during such movement to create an expanded opening for introducing therethrough a predetermined quantity of ground coffee particles and hot water when the holder and bag are in operative positions.

In the preferred embodiment the rear portion of the holder is of looped configuration, both said forward and rear portions being in substantially one plane, so that when horizontally disposed upon a suitable container the filter bag will freely depend downwardly therefrom, the said front and rear portions being supported by the upper rim of the container.

Other embodiments having the main components above referred to are described hereinbelow.

DESCRIPTION OF THE DRAWINGS

FIG. 6 is a fragmentary view of a coffee pot shown operatively supporting the assembly of the holder member and filter bag, the coffee pot being shown in section with a part broken away.

FIG. 7 is a plan view of FIG. 6, parts of the filter bag being removed for clarity.

FIG. 8 is a fragmentary perspective view of a coffee pot shown operatively supporting another embodiment of the filter device of this invention.

FIG. 9 is a fragmentary perspective view of another coffee pot shown operatively supporting still another embodiment of the filter device of this invention.

FIG. 10 is a plan view of FIG. 9, a part of the filter bag and wire holder being broken away for clarity.

DESCRIPTION OF PREFERRED EMBODIMENTS

Figure 1:
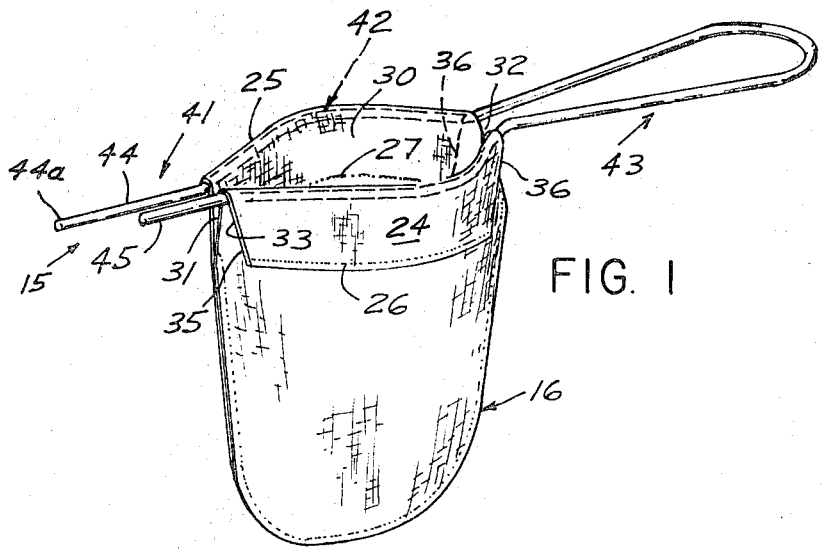
FIG. 1 is a perspective view of the assembly of filter bag and holder member according to one form of this invention.
Figure 2:
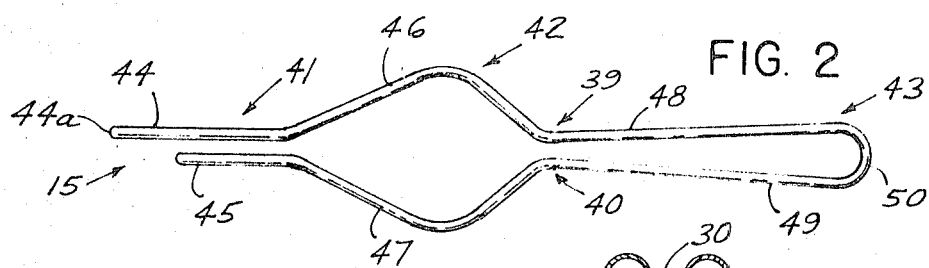
FIG. 2 is a plan view of the holder member of FIG. 1.
Figure 3:
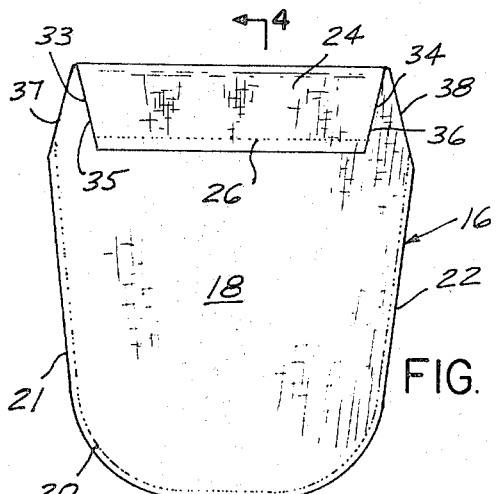
FIG. 3 is a front view of the filter bag of FIG. 1 shown in its flat inoperative condition.
Figure 4:
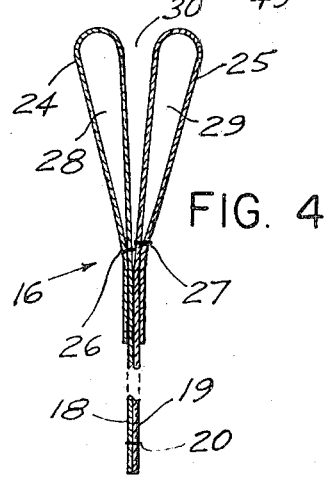
FIG. 4 is a fragmentary enlarged section of FIG. 5 taken along line 4—4.
Figure 5:
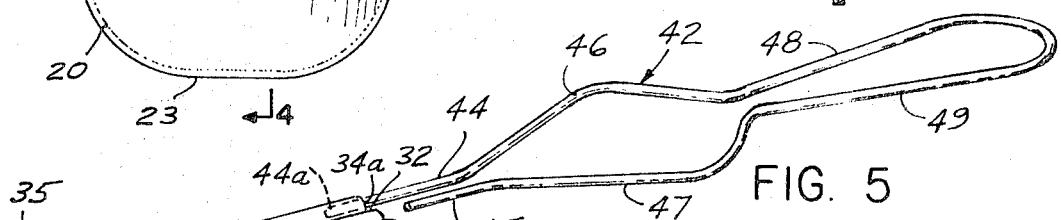
FIG. 5 is a perspective view showing the said holder member in its initial position while being inserted into the said filter bag, a fragment of the latter being shown.

In the form of this invention illustrated in FIGS. 1 to 7 inclusive, the holder member 15 is adapted to support the filter bag 16 which is preferably made of suitable filter paper, the holder itself being adapted to be supported by the coffee pot 17 as shown in FIGS. 6 and 7.

The said filter bag 16 comprises two flat sheets 18 and 19 secured together by a line of stitching 20 along the side peripheries 21 and 22 and the bottom periphery 23 of said bag, leaving the upper portions of said sheets unattached to form the mouth of the bag, as will more clearly hereinafter appear. For convenience the said periphery 21 will be regarded as the front side of the bag and the periphery 22 as the rear side thereof. In the particular embodiment illustrated, the opposite upper unattached portions of said two respective sheets are folded back and downwardly to form the flaps 24 and 25, the lower edges of said respective flaps being secured by the respective lines of stitching 26 and 27 to the adjacent sheets 18 and 19, respectively. The construction is such as to form two transverse loops constituting the two respective open-ended channels 28 and 29 at the upper portion of the bag and in flanking relation to the top opening or mouth 30 thereof. The upper portion of the bag is slit at the front and rear edges thereof to form the respective front and rear slits 31 and 32 above and substantially in line with said respective peripheries 21 and 22. The arrangement is such that said respective slits are positioned intermediate the two front openings 33 and 33a and the two rear openings 34 and 34a of said channels 28 and 29, respectively. The front and rear edges 35 and 36 of each of the said channels 28 and 29 are inclined downwardly and inwardly, and are accordingly spaced inwardly from the respective front and rear edges 37 and 38 of the respective slits 31 and 32, thereby clearly exposing the said openings 33, 33a and 34, 34a of the respective channels 28 and 29 for easy assembly of said bag 16 and holder member 15, as will more clearly appear from the description hereinafter given. The said peripheral portions 21 and 22 of the bag are in downwardly converging relation in the preferred construction.

The said holder member 15 is made of smooth wire bent into the form of two adjacent longitudinally extending arms 39 and 40 in spaced relation, said arms together forming a front portion 41, an intermediate portion 42 and a rear portion 43. Said front portion comprises the two closely spaced, preferably parallel, terminal fingers 44 and 45, the forming being longer than the latter. Said intermediate portion constitutes a laterally expanded portion, the laterally opposite portions 46 and 47 being bent outwardly in opposite directions into curved or arcuate configurations. Said rear portion comprises the sections 48 and 49 joined at the rear loop 50. Said front, intermediate and rear portions 41, 42 and 43 are, in this embodiment, in substantially one plane, so that the holder can rest on opposite rim portions of a coffee pot in a horizontal plane.

In assembling the holder member 15 and bag 16 for operative use, the leading portion 44a of the longer terminal finger 44 of the holder is first inserted into the rear opening 34a of the upper peripheral channel 29 of the bag, said opening being, as aforesaid, exposed for ready insertion. As the holder is moved forwardly the opposite terminal finger 45 enters the rear opening 34 of the channel 28, the slidable engagement of said longer terminal finger 44 with the wall of said channel 29 serving to guide the terminal finger 45 into the channel 2—8 without the need to do any probing. As the forward movement of the holder member 15 is continued, the laterally opposite curved sections 46 and 47 of the intermediate section 42 slidably move through both of said channels and deform the upper portion of the bag to cause a spreading thereof, whereby the open mouth 30 is formed, as illustrated in FIGS. 1 and 7. Such a deformation is effected without any tearing or mutilation of the walls of the bag inasmuch as the sides forming the said slits 31 and 32 are caused to separate, the said slits widening upon the continued forward movement of said holder member.

Upon the completion of the assembly of the holder member and bag, the terminal fingers 44 and 45 of the forward section 41 of the holder member extend forwardly from the bag, and the rear section 43 extends rearwardly therefrom. In this position the bag is freely suspended from the intermediate section 42 of the holder, the said forward and rear sections 41 and 43, respectively, now being adapted for operative placement upon the upper rim 51 of the coffee pot 17, as illustrated in FIGS. 6 and 7. It will be observed that the said forward section 41 of the holder member serves the double purpose of facilitating the assembly of the bag and holder member and, coactively with the rim of the pot 17, of supporting the bag 15 is free suspension within said pot 17. The rear section 43 of the holder serves the double purpose of coacting with he rim of the pot 17 to support the bag, and serving as a handle for the manual manipulation of the holder. The said intermediate section 42 serves the double function of serving as supporting means for the suspended bag 16 and of serving as a spreading tool for effecting the deformation of the top of the bag, at least that portion being flexible, to form an enlarged mouth 30.

The holder 15 and bag 16 are so proportioned with respect to the coffee pot 17 that when the holder and bag are operatively in place, the entire bag is in spaced relation to the interior walls of the coffee pot, and is therefore in free suspension. This arrangement, together with that of the downwardly and inwardly inclined sides of the bag, enable the entire lateral and bottom portions thereof to serve as unobstructed filtering areas. When a predetermined amount of ground coffee particles is operatively inserted through the enlarged mouth 30 into the bag and hot water poured thereover, the relatively large filtration area will produce a high-quality coffee filtrate in a minimum of time.

It has been found that due to the large effective filtration area of the bag there is no clogging, so that, if desired, the bag may be reused. It is also noteworthy that because of the spread of the mouth 30 effectuated in the manner above described, the ground coffee and the hot water can readily be delivered into the bag through the mouth with no danger of spilling the coffee grounds of water outside of the bag and into the pot, thereby assuring that the filtrate will be pure, clean and uncontaminated. And when it is desired to dispose of the bag 16, all that need be done is to retract the holder member 15 by sliding it rearwardly through the said channels 28 and 29 until the bag and holder are separated, without any danger of breaking or mutilating the wet bag.

The embodiment of this invention shown in FIG. 8 is substantially similar to the form above described, except that the holder member 52 has at the rear thereof the upwardly extending loop portion 53 suspended from the hooks 54 extending inwardly from the wall of the pot 55. The expanded intermediate portion of the holder comprising the oppositely disposed sections 56 and 57 serves the tool function of effecting the same spreading action of the mouth as in the form above described.

The embodiment of FIGS. 9 and 10 illustrates a coffee pot 58 with a plurality of internal circumferential ribs 59, 60 and 61 adapted to support the horizontally disposed loop 62 connected by vertical arms 63 and 64 to the underlying oppositely extending curved sections 65 and 66 of the holder member 67.

The embodiments of FIG. 8 and FIGS. 9 and 10 are substantially similar in operation and function to the form first above described, but are adapted for use with special coffee pots where it is required that the bag be placed below the upper rim of the coffee pot.

In the above description, the invention has been disclosed merely by way of example and in preferred manner; but obviously many variations and modifications may be made therein. It is to be understood, therefore, that the invention is not limited to any particular form or manner of practicing same.

I claim:

1. A filter device for use with an open-top container, said filter device comprising an open-top filter bag having an upper portion with laterally opposite sides provided with two longitudinal channels with opposite open ends, and a holder member including two adjacent arms slidably interengageable in the channels in the upper portion of said filter bag, whereby said bag is held by said holder member in suspension, said arms of said holder member including preformed, laterally bent portions constituting a spreading means for spreading said opposite sides of the upper portion of the bag apart when said arms are inserted into the channels, whereby the opening at the top of the bag is formed into an enlarged mouth, said holder member including front and rear portions protruding longitudinally from respective front and rear open ends of said filter bag to serve as a means for supporting said holder member on said container in predetermined operative position, said filter bag being disposed within said container when the holder member is in said position, said laterally bent portions extending laterally outwards of said front and rear portions, and said arms extending substantially longitudinally at said front portion to enable insertion of the holder into said bag.

2. A filter device according to claim 1, wherein said bent portions of said arm are bent laterally in opposite directions and are disposed within and in slidable engagement with said respective channels in said bag, whereby said upper sections of the bag are spread in conformity with the configuration of said bent portions of the holder member to form said enlarged mouth.

3. A filter device according to claim 1, said filter bag depending down from and being supported by said bent portions of the holder member.

4. A filter device according to claim 1, said spreading means of the holder member being disposed intermediate said front and rear portions thereof.

5. A filter device according to claim 4, said front, rear and intermediate portions lying in substantially one plane.

6. A filter device according to claim 1, said arms of the holder member having two forwardly disposed terminal fingers protruding from the front ends of said respective channels, and two rearwardly disposed sections protruding from the rear ends of said respective channels, said forwardly disposed fingers and said rearwardly disposed sections constituting said means for supporting the holder member on the container.

7. A filter device according to claim 6, one of said terminal fingers being longer than the other.

8. A filter device according to claim 6, said forwardly disposed terminal fingers being in closely spaced substantially parallel relation, said rearwardly disposed sections being connected at their rearmost portions.

9. A filter device according to claim 1, said holder member being a continuous wire, and laterally bent portions thereof being of curved configuration and lying in one plane.

10. A filter device according to claim 1, said holder member having a rearwardly disposed upright looped section connected to said laterally opposite bent portions, and hooked means on the inner wall of said container and in supporting engagement with said looped section;

11. A filter device according to claim 1, said holder member having a horizontally disposed loop disposed above and in spaced relation to said bent portions, and supporting means on the inner wall of said container and in underlying supporting engagement with said loop;

12. A filter device according to claim 1, said filter bag having downwardly converging sides, said sides being in spaced relation to the inner wall of the container when the filter bag is in its said operative position.

13. A filter device according to claim 1, said upper portion of the filter bag being slit at the front and rear ends thereof, whereby the walls defining said slits will separate upon an operative spreading of the said laterally opposite sections of said upper portion.

14. A filter device according to claim 1, said filter bag being formed of two flat sheets of filter material secured together at the front, rear and bottom peripheries, the upper portions of said sheets being unattached, said upper portion being slit at the front and rear ends thereof, whereby the walls defining said slits will separate upon an operative spreading of the said laterally opposite sections of said upper portion.

15. A filter device according to claim 14, the upper portions of said two sheets being bent downwardly and formed into open-ended loops constituting said respective channels, said front and rear slit portions being disposed intermediate the respective two adjacent front and two rear channel openings.

16. A filter device according to claim 15, the adjacent sides defining each of said slit portions and the edges defining the adjacent channel openings being in downwardly divergent relation, whereby said channel openings are clearly exposed to view.